(12) United States Patent
Humphrey et al.

(10) Patent No.: US 9,054,593 B2
(45) Date of Patent: Jun. 9, 2015

(54) IMPEDANCE CONTROL FOR A POWER CONVERTER

(75) Inventors: Daniel Humphrey, Houston, TX (US); Mohamed Amin Bemat, Cypress, TX (US)

(73) Assignee: Hewlett-Packard Development Company, L.P., Hosuton, TX (US)

( * ) Notice: Subject to any disclaimer, the term of this patent is extended or adjusted under 35 U.S.C. 154(b) by 950 days.

(21) Appl. No.: 13/151,939

(22) Filed: Jun. 2, 2011

(65) Prior Publication Data

US 2012/0307528 A1 Dec. 6, 2012

(51) Int. Cl.
*H02M 3/335* (2006.01)
*H02M 7/08* (2006.01)
*H02M 1/00* (2006.01)

(52) U.S. Cl.
CPC .......... *H02M 3/33592* (2013.01); *H02M 7/08* (2013.01); *H02M 2001/0045* (2013.01); *Y02B 70/1475* (2013.01)

(58) Field of Classification Search
USPC ......... 323/208–210, 225, 233, 282–285, 290, 323/351; 363/21.06, 21.14, 65–69
See application file for complete search history.

(56) References Cited

U.S. PATENT DOCUMENTS

| | | | |
|---|---|---|---|
| 5,956,245 A * | 9/1999 | Rozman | 363/89 |
| 6,084,790 A | 7/2000 | Wong | |
| 6,424,129 B1 | 7/2002 | Lethellier | |
| 6,618,274 B2 * | 9/2003 | Boylan et al. | 363/17 |
| 6,768,658 B2 | 7/2004 | Perry | |
| 6,803,750 B2 | 10/2004 | Zhang | |
| 7,372,240 B2 | 5/2008 | Khayat et al. | |
| 7,479,772 B2 * | 1/2009 | Zane et al. | 323/272 |
| 8,159,205 B1 * | 4/2012 | Latham et al. | 323/286 |
| 8,493,754 B1 * | 7/2013 | Wambsganss et al. | 363/65 |

\* cited by examiner

*Primary Examiner* — Jessica Han
(74) *Attorney, Agent, or Firm* — Tarolli, Sundheim, Covell & Tummino LLP

(57) ABSTRACT

A power supply system and method are disclosed. The system includes a power converter comprising a switching stage to conduct an output current in response to switching signals having a defined duty-cycle. The output current can be provided at an output of the power converter system. The system also includes a current monitor to sense a magnitude of the output current. The system further includes a gate drive controller to generate the switching signals and to control an output impedance of the switching stage based on the sensed magnitude of the output current to control the magnitude of the output current.

11 Claims, 2 Drawing Sheets

IMPEDANCE CONTROL FOR A POWER CONVERTER

BACKGROUND

Power converters, such as direct current to direct current (DC/DC) power converters are implemented in a variety of electronic devices to convert an input DC voltage to an output DC voltage. There are various types of DC/DC power converters, such as buck, boost, or buck/boost switching converters. Some power supply systems can implement a plurality of power converters arranged in parallel to provide redundant power to electronic systems. In such cases, impedance matching circuits are typically implemented to ensure that the output impedance of the parallel power converters are substantially balanced.

DETAILED DESCRIPTION

Figure 1:
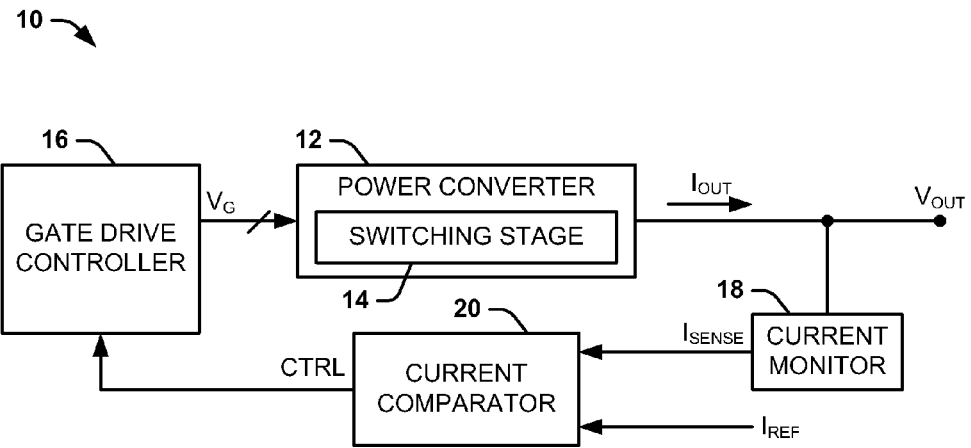
FIG. 1 illustrates an example of a power supply system.

FIG. 1 illustrates an example of a power supply system 10. The power supply system 10 can be configured to provide an output voltage $V_{OUT}$ to any of a variety of electronic components. The output voltage $V_{OUT}$ can be generated based on the flow of an output current $I_{OUT}$, such as through an output inductor (not shown). In the example of FIG. 1 and as described herein, the power supply system 10 is demonstrated as a direct current to direct current (DC/DC) power supply. For example, the power supply system 10 can be implemented in any of a variety of handheld electronic devices, such as a wireless communications device or portable computing device. As an example, the power supply system 10 can operate in open-loop configuration with respect to the output voltage $V_{OUT}$, such that the power supply system 10 can operate substantially more efficiently than a typical closed-loop DC/DC converter. However, it is to be understood that other control schemes can be implemented for generation of the output voltage $V_{OUT}$, such as independent of the output impedance control schemes described herein.

The power supply system 10 includes a power converter 12. The power converter 12 can be configured as any of a variety of power converter types, such as a buck converter, a boost converter, a buck/boost converter, or a resonant power converter. The power converter 12 can generate the output voltage $V_{OUT}$ in response to activation of one or more power switches in a switching stage 14 via a respective one or more switching signals, demonstrated in the example of FIG. 1 as a signal $V_G$. As an example, the switching stage 14 can include one or more switches, such as metal-oxide semiconductor field effect transistors (MOSFETs) that couple an input voltage (not shown) to an output inductor through which an output current $I_{OUT}$ flows. As another example, the switching stage 14 can include a set of switches that are configured as an output rectifier that interconnect the output inductor and a secondary winding of a transformer, such that the set of switches of the switching stage 14 are alternately activated to direct the current through the output inductor. As an example, the switching signals $V_G$ can be voltage signals for activating voltage-controlled switching devices, current signals for activating current-controlled devices, or a signal having variable voltage and current characteristics for activating a variety of other types of switching devices.

In the example of FIG. 1, the switching signals $V_G$ are generated by a gate drive controller 16. The gate drive controller 16 can generate the switching signals $V_G$ at a duty-cycle that determines the activation of the switches in the switching stage 14. For example, the switching signals $V_G$ can be generated by the gate drive controller 16 to have a substantially constant duty-cycle, such as a maximum non-overlapping duty-cycle. As a result, the power supply system 10 can operate with substantially high efficiency. As used herein, the terms "maximum duty-cycle" and "maximum non-overlapping duty-cycle" refer to a duty-cycle that has approximately equal on-times and off-times for an alternately activated one pair of switches or two pairs of switches in a manner such that at least one switch is activated at almost any given time without any activation overlap between the alternate pair or two pairs of switches. Additionally, the term "substantially constant" is used to mean that while the effect may be intended to be constant, variations can exist in an implementation or embodiment, such as due to process variations.

It may be desirable to control the output impedance of the power supply system 10, such as to match the output impedance of the power supply system 10 to any of a variety of other associated electronic components (e.g., to one or more additional power converters or other load). Similarly, it may be desirable to control the magnitude of the output current $I_{OUT}$ to within a given tolerance, such as based on specifications or to implement load sharing. Therefore, the power supply system 10 is configured to control the output impedance of the switching stage 14 based on the magnitude of the output current $I_{OUT}$.

In the example of FIG. 1, the power supply system 10 also includes a current monitor 18 configured to monitor the output current $I_{OUT}$. As an example, the current monitor 18 can include a current sense resistor or any of a variety of other current sensing electronic components. The current monitor 18 thus generates a signal $I_{SENSE}$ (e.g., a voltage having a value) that is indicative of a magnitude of the output current $I_{OUT}$. The power supply system 10 also includes a current comparator 20 that is configured to compare the signal $I_{SENSE}$ with a signal $I_{REF}$ that can be indicative of a reference current magnitude. Therefore, current comparator 20 can compare the magnitude of the output current $I_{OUT}$ (i.e., via the signal $I_{SENSE}$) with a predetermined reference current magnitude (i.e., via the signal $I_{REF}$). The current comparator 20 can provide a control signal CTRL corresponding to a difference between the magnitude of the output current $I_{OUT}$ and the predetermined reference current $I_{REF}$.

The control signal CTRL can be provided to the gate drive controller 16. The gate drive controller 16 can be configured to adjust a magnitude of the switching signals $V_G$ to control the output impedance of the switching stage 14 based on the control signal CTRL, and thus in response to the comparison of the magnitude of the output current $I_{OUT}$ with the predetermined reference current magnitude $I_{REF}$. As used herein, adjusting the magnitude of the switching signals $V_G$ can refer to adjusting the magnitude of the "on" portion of the duty-cycle of the switching signals $V_G$ (e.g., the magnitude of the "on" voltage or the "on" current). As a result, an activation resistance $R_{DS\_ON}$ of the switches in the switching stage 14 can be increased or decreased, thus respectively decreasing or increasing the magnitude of the output current $I_{OUT}$.

For example, the switches of the switching stage 14 can be N-channel devices that are activated by logic-high states of the switching signals $V_G$. Therefore, increasing the activation voltage (i.e., the "on" portion) of the switching signals $V_G$ can decrease the activation resistance $R_{DS\_ON}$ of the switches in the switching stage 14. For example, the activation resistance $R_{DS\_ON}$ can change from approximately 1.75 mΩ at approximately 3.2 V down to approximately 1 mΩ at approximately 10 V, thus achieving an approximately 75% variance in the activation resistance $R_{DS\_ON}$. Accordingly, the magnitude of the output current $I_{OUT}$ can likewise be adjusted relative to the reference current magnitude $I_{REF}$ in response to the control signal CTRL. For example, the reference current magnitude $I_{REF}$ can correspond to a desired magnitude of the output current $I_{OUT}$ for proper impedance matching of the output of the power supply system 10, such as with one or more additional electronic components. Therefore, the gate drive controller 16 can set the magnitude of the output current $I_{OUT}$ to be substantially equal to the predetermined reference current magnitude $I_{REF}$ to implement impedance matching for the power supply system 10.

Figure 2:
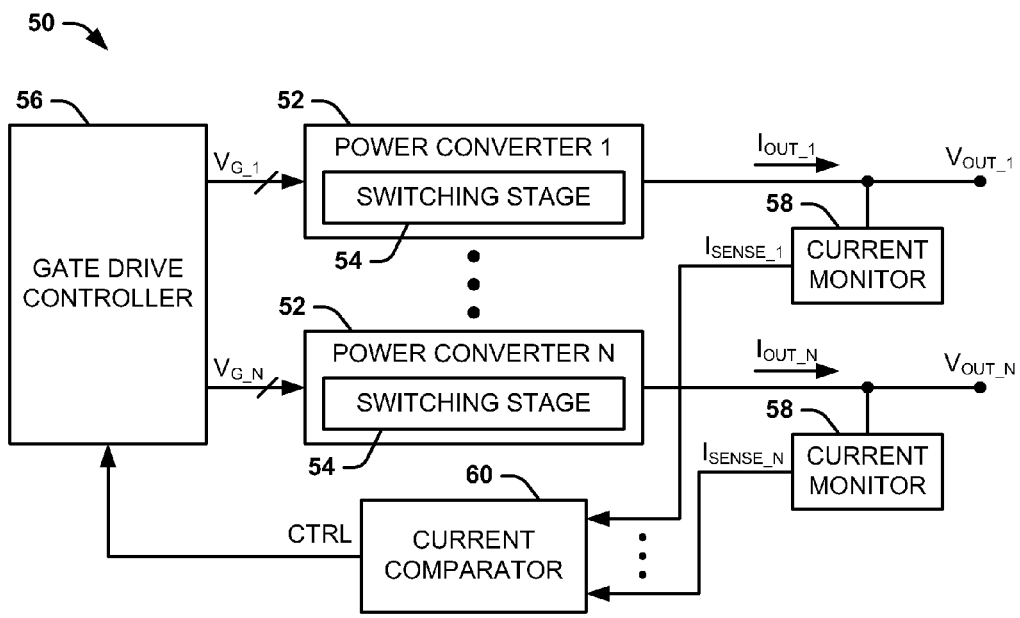
FIG. 2 illustrates an example of a parallel power supply system.

FIG. 2 illustrates an example of a parallel power supply system 50. The parallel power supply system 50 comprises a plurality N of power converters 52, where N is a positive integer greater than one, that are each configured to generate respective plurality N of output voltages $V_{OUT}$, demonstrated in the example of FIG. 2 as $V_{OUT\_1}$ through $V_{OUT\_N}$. Each of the respective output voltages $V_{OUT\_1}$ through $V_{OUT\_N}$ can be generated based on the flow of output currents $I_{OUT\_1}$ through $I_{OUT\_N}$ generated by each of the respective power converters 52, such as through output inductors (not shown). As an example, the parallel power supply system 50 can be implemented in any of a variety of applications, such as for computer server applications. For example, each of the power converters 52 can be DC/DC power supplies operating in open-loop configuration with respect to the magnitude of the respective output voltages $V_{OUT\_1}$ through $V_{OUT\_N}$. However, it is to be understood that other control schemes can be implemented for generation of the respective output voltages $V_{OUT\_1}$ through $V_{OUT\_N}$, such as independent of the output impedance control schemes described herein for distributing power to circuitry in computer server applications.

Similar to as described above in the example of FIG. 1, the power converters 52 can each be configured as any of a variety of power converter types, such as a buck converter, a boost converter, a buck/boost converter, or a resonant power converter, thus generating the output voltages $V_{OUT\_1}$ through $V_{OUT\_N}$ in response to activation of one or more power switches in respective switching stages 54 via a respective one or more switching signals, demonstrated in the example of FIG. 2 as signals $V_{G\_1}$ through $V_{G\_N}$. As an example, the switching stages 54 can each include one or more switches, such as MOSFETs that are configured as an output rectifier that interconnect an output inductor and a secondary winding of a transformer, such that the sets of switches of the switching stage 54 are alternately activated to direct the current through the output inductor.

In the example of FIG. 2, a gate drive controller 56 generates the switching signals $V_{G\_1}$ through $V_{G\_N}$, such as at a maximum non-overlapping duty-cycle. Similar to as described above regarding the example of FIG. 1, the gate drive controller 56 can control the output impedance of the respective switching stages 54 individually based on the magnitudes of the respective output currents $I_{OUT\_1}$ through $I_{OUT\_N}$. The magnitudes of the output currents $I_{OUT\_1}$ through $I_{OUT\_N}$ are each monitored by respective current monitors 58 that provide a respective set of signals $I_{SENSE\_1}$ through $I_{SENSE\_N}$ that represent the respective output currents $I_{OUT\_1}$ through $I_{OUT\_N}$. Thus, a current comparator 60 is configured to compare the signals $I_{SENSE\_1}$ through $I_{SENSE\_N}$ to compare the magnitudes of the output currents $I_{OUT\_1}$ through $I_{OUT\_N}$, such that one or more of the output currents $I_{OUT\_1}$ through $I_{OUT\_N}$ serve as reference current magnitudes for a comparison, similar to as described above in the example of FIG. 1. The current comparator 60 thus provides a control signal CTRL that is indicative of the relative differences between the magnitudes of the output currents $I_{OUT\_1}$ through $I_{OUT\_N}$.

As a result of the relative comparisons of the magnitudes of the output currents $I_{OUT\_1}$ through $I_{OUT\_N}$ indicated by the control signal CTRL, gate drive controller 56 can thus be configured to adjust the magnitudes of the activation voltages of the switching signals $V_{G\_1}$ through $V_{G\_N}$ to control the output impedance of each of the switching stages 54 accordingly. As a result, the activation resistance $R_{DS\_ON}$ of the switches in each of the switching stages 54 can be increased or decreased to respectively decrease or increase the magnitudes of the output currents $I_{OUT\_1}$ through $I_{OUT\_N}$. For example, the gate drive controller 56 can set the magnitudes of the output currents $I_{OUT\_1}$ through $I_{OUT\_N}$ to be substantially equal to each other to implement impedance matching of each of the power converters 52 of the parallel power supply system 50. As an example, the gate drive controller 56 can select one or more of the output currents $I_{OUT\_1}$ through $I_{OUT\_N}$ having a given magnitude and increase and/or decrease the magnitudes of the remaining output currents $I_{OUT\_1}$ through $I_{OUT\_N}$ to set the magnitudes of the remaining output currents $I_{OUT\_1}$ through $I_{OUT\_N}$ approximately equal to the selected one or more of the output currents $I_{OUT\_1}$ through $I_{OUT\_N}$. As another example, the gate drive controller 56 can be configured to set the magnitudes of each of the output currents $I_{OUT\_1}$ through $I_{OUT\_N}$ approximately equal to a predetermined reference current magnitude $I_{REF}$ (not shown).

Based on the adjustments of the output impedances of the switching stages 54, the parallel power supply system 50 can implement impedance matching of the power converters 52 in a simplified and inexpensive manner relative to typical parallel power supply systems. As an example, typical parallel power supply systems that implement impedance matching circuits for matching the output impedance of respective power converters can occupy greater physical space, which is typically constrained. In addition, such impedance matching circuits often cannot guarantee proper current sharing with respect to output currents based on variations between fabricated circuit components. As a result, a lack of adequate power sharing between the power converters of a typical parallel power supply system can result in a decrease in total power available, thus potentially increasing cost.

As another example, the gate drive controller 56 can be configured to adjust output impedance control of the power converters 52 individually with respect to each other. For example, the power converters 52 could be providing approximately equal load-sharing based on substantially matched output impedances. However, a given one or more of the power converters 52 could be operating at a higher temperature relative to the other power converters 52, such as based on variations in environment and/or circuit fabrication. As a result, the gate drive controller 56 can be configured to change the relative impedances of the power converters 52 to shift loading between the power converters 52, such as to regulate the respective temperatures of the power converters 52. Therefore, the gate drive controller 56 can be configured to control the output impedance of the power converters 52 for a variety of reasons.

It is to be understood that the parallel power supply system 50 is not limited to the example of FIG. 2. For example, the current comparator 60 could be implemented as comprising separate current comparators, one for each of the current monitors 58, such that each of the output currents $I_{OUT\_1}$ through $I_{OUT\_N}$ could be compared with a predetermined reference current magnitude $I_{REF}$ individually. In such an example, the predetermined reference current magnitudes $I_{REF}$ could each be separately programmable, such as by one or more processors, or could be uniform with respect to each of the individual current comparators 60. Thus, the parallel power supply system 50 can be configured in a variety of ways.

Figure 3:
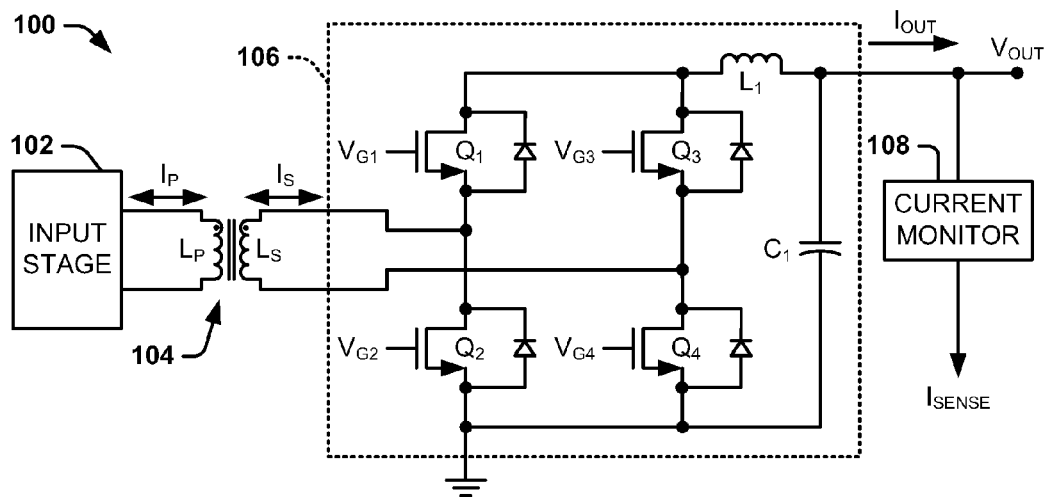
FIG. 3 illustrates an example of a power converter.

FIG. 3 illustrates an example of a power converter 100. The power converter 100 can correspond to the power converter 12 in the example of FIG. 1 or one or more of the power converters 52 in the example of FIG. 2. Therefore, reference is to be made to the example of FIGS. 1 and 2 in the example of FIG. 3.

The power converter 100 includes an input stage 102 coupled to a primary winding $L_P$ of a transformer 104. As an example, the input stage 102 can include one or more switches that are activated to generate a primary resonant current $I_P$ through the primary winding $L_P$ of the transformer 104. As a result, the primary resonant current can induce a current $I_s$ in a secondary inductor $L_S$ in the transformer 104 based on magnetic coupling in a core of the transformer 104.

The power converter 100 also includes a switching stage 106 coupled to the secondary winding $L_S$ of the transformer 104. The switching stage 106 includes two pairs of MOSFET switches, demonstrated in the example of FIG. 3 as $Q_1$-$Q_4$, that are alternately activated to rectify the induced current $I_s$ to generate an output current $I_{OUT}$ through an output inductor $L_1$. In the example of FIG. 3, the switches $Q_1$ through $Q_4$ are configured as N-channel MOSFETs with anti-parallel rectifier diodes, but it is to be understood that the switches $Q_1$ through $Q_4$ can be configured as a variety of different types of switches. For instance, the switches $Q_1$ and $Q_4$ can be activated concurrently by respective switching signals $V_{G1}$ and $V_{G4}$ and the switches $Q_2$ and $Q_3$ can be activated concurrently by respective switching signals $V_{G2}$ and $V_{G3}$ alternately with the switches $Q_1$ and $Q_4$. As an example, the switching signals $V_{G1}$ through $V_{G4}$ can have a substantially fixed duty-cycle, such as a maximum duty-cycle that is non-overlapping with respect to the alternate activation of the switches $Q_1$ and $Q_4$ and the switches $Q_2$ and $Q_3$. Thus, based on the switching of the switches $Q_1$ through $Q_4$, the output current $I_{OUT}$ is provided through the output inductor $L_1$ to generate an output voltage $V_{OUT}$ across an output capacitor $C_1$.

As an example, the switching signals $V_{G1}$ through $V_{G4}$ can be generated by the gate drive controller 16 in the example of FIG. 1 or the gate drive controller 56 in the example of FIG. 2. Thus, the voltages of the switching signals $V_{G1}$ through $V_{G4}$ can be controlled by the respective gate drive controller 16 or 56 to control an output impedance of the power converter 100, such as based on the magnitude of the output current $I_{OUT}$. For example, a current monitor 108 can monitor a magnitude of the output current $I_{OUT}$ and provide a signal $I_{SENSE}$ to the gate drive controller 16 or 56. In response, the gate drive controller 16 or 56 can increase or decrease the activation voltage of the switches $Q_1$ through $Q_4$ to adjust the activation resistance $R_{DS\_ON}$ of the switches $Q_1$ through $Q_4$. As a result, the output current $I_{OUT}$ is adjusted accordingly. As an example, the gate drive controller 16 or 56 can change the activation voltage of a given pair of switching signals $V_{G1}$ and $V_{G4}$ or $V_{G2}$ and $V_{G3}$ substantially the same, such as based on the pairs of switching signals $V_{G1}$ and $V_{G4}$ or $V_{G2}$ and $V_{G3}$ having the same signal source. As another example, the gate drive controller 16 or 56 can change the activation voltage of all of the switching signals $V_{G1}$ through $V_{G4}$ individually, such as to provide better flexibility of output impedance control of the power converter 100.

It is to be understood that the power converter 100 is not intended to be limited to the example of FIG. 3. For example, while the switching stage 106 is demonstrated in the example of FIG. 3 as a full-bridge rectifier, other switching stage topologies can be implemented instead. For example, the switching stage 106 can be configured as a two-switch rectifier in which the output inductor $L_1$ is coupled to a center of the secondary winding $L_S$ and the alternately activated switches are coupled to each respective end of the secondary winding $L_S$. As another example, the switching stage 106 can be configured as a two-switch free-wheeling rectifier stage in which each alternately activated switch is coupled to the output inductor $L_1$ and coupled to opposite ends of the secondary winding $L_S$. Furthermore, the power converter 100 could instead be implemented as a different type of power converter altogether, such as a buck, boost, or buck/boost converter, in which the switching stage 106 is instead configured as one or more switches that couple an input voltage to the output inductor $L_1$. Accordingly, the output impedance control techniques described herein can be applicable to any of a variety of DC/DC power converter topologies.

Figure 4:
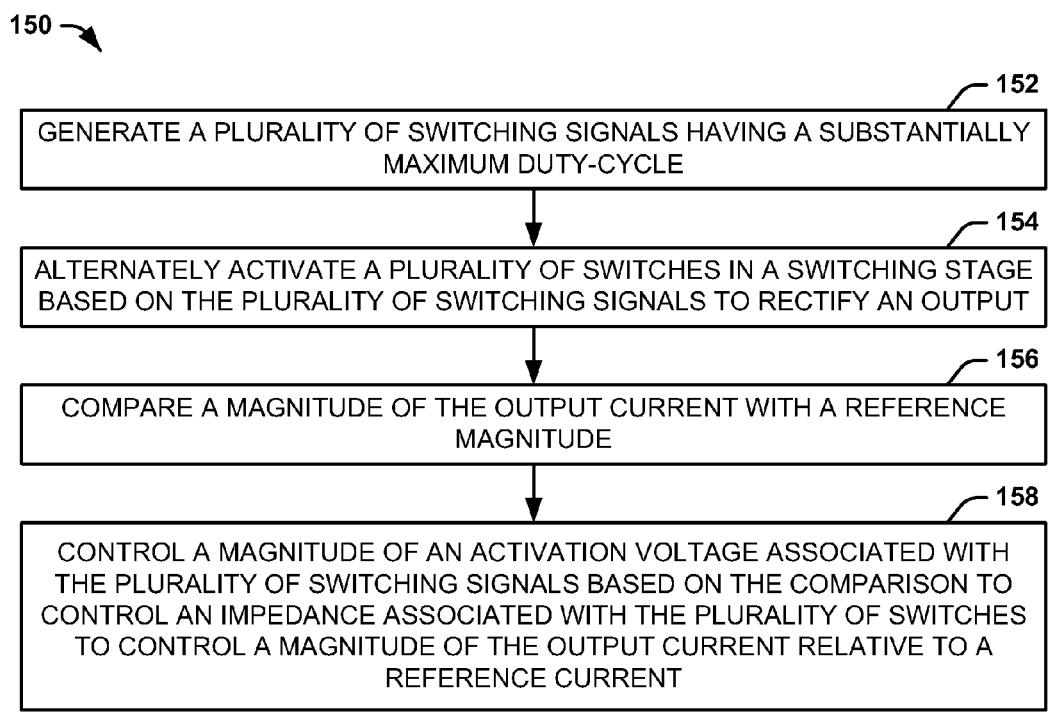
FIG. 4 illustrates an example of a method for controlling an output current of a power supply system.

In view of the foregoing structural and functional features described above, an example method will be better appreciated with reference to FIG. 4. While, for purposes of simplicity of explanation, the method of FIG. 4 is shown and described as executing serially, it is to be understood and appreciated that the method is not limited by the illustrated order, as parts of the method could occur in different orders and/or concurrently from that shown and described herein.

FIG. 4 illustrates an example of a method 150 for controlling a magnitude of an output current of a power supply system. At 152 a plurality of switching signals (e.g., switching signals $V_G$ of FIG. 1) having a substantially maximum duty-cycle are generated. At 154, a plurality of switches in a switching stage (e.g., the switching stage 14 of FIG. 1) is alternately activated based on the plurality of switching signals to rectify an output current. At 156, a magnitude of the output current is compared with a reference magnitude (e.g., by comparator 20 of FIG. 1). At 158, a magnitude of an activation voltage associated with the plurality of switching signals is controlled (e.g., by the controller 16 of FIG. 1) based on the comparison to control an impedance associated with the plurality of switches to control the magnitude of the output current relative to the reference current.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A power supply system comprising:
    a power converter comprising a switching stage to conduct an output current in response to switching signals having a predefined duty-cycle, the output current being provided at an output of the power converter;
    a current monitor to sense a magnitude of the output current;
    a gate drive controller to generate and to control a magnitude of the switching signals and to control an output impedance of the switching stage based on the sensed output current to control the magnitude of the output current;
    a second power converter comprising a second switching stage to conduct a second output current in response to second switching signals, the second output current being provided to generate a second output voltage at an output of the second power converter;
    a second current monitor to sense a magnitude of the second output current; and
    a current comparator to compare the magnitude of the output current with the magnitude of the second output current, such that the gate drive controller is to control the output impedance of the switching stage based on the comparison to control the magnitude of the output current.

2. The system of claim 1, wherein the gate drive controller is to control the magnitude of the switching signals to adjust an activation resistance of switches in the switching stage to control the output impedance of the switching stage.

3. The system of claim 1, further comprising a transformer to inductively generate the output current at a secondary winding of the transformer based on a current flow through a primary winding of the transformer, such that the switching stage is to rectify the output current.

4. The system of claim 3, wherein the switching stage is arranged as a full-bridge rectification stage comprising two pairs of alternately activated switches.

5. The system of claim 4, wherein the gate drive controller is to control a magnitude of an activation signal of each transistor of each of the two pairs of alternately activated switches individually with respect to each other to adjust an activation resistance of each transistor of each of the two pairs of alternately activated switches individually to control the output impedance of the switching stage.

6. The system of claim 1, wherein the current comparator is to compare the magnitude of the output current with a predetermined reference, such that the gate drive controller is to control the output impedance of the switching stage based on the comparison to set the magnitude of the output current approximately equal to the predetermined reference.

7. The system of claim 1, wherein the gate drive controller is to control the output impedance of the switching stage based on the comparison to set the magnitude of the output current to be approximately equal to the magnitude of the second output current.

8. A method for controlling an output current of a power supply system, the method comprising:
    generating a plurality of switching signals having a substantially maximum duty-cycle;
    alternately activating a plurality of switches in a switching stage of a first power converter based on the plurality of switching signals to provide the output current;
    generating a second plurality of switching signals having the substantially maximum duty-cycle;
    alternately activating a second plurality of switches in a switching stage of a second power converter based on the second plurality of switching signals to provide a second output current;
    comparing a magnitude of the output current with a reference, wherein the reference comprises the second output current, such that comparing the magnitude of the output current comprises comparing the magnitude of the output current with a magnitude of the second output current; and
    controlling a magnitude of the plurality of switching signals based on the comparison to control an impedance associated with the plurality of switches to control the magnitude of the output current relative to the reference, wherein controlling the magnitude of the plurality of switching signals comprises controlling the magnitude of the plurality of switching signals based on the comparison to control the impedance associated with the plurality of switches to control the magnitude of the output current relative to the second output current.

9. The method of claim 8, wherein controlling the magnitude of the plurality of switching signals comprises controlling the magnitude of the plurality of switching signals based on the comparison to control the impedance associated with the plurality of switches to set the magnitude of the output current approximately equal to the reference.

10. The system of claim 1, wherein the predefined duty-cycle is a substantially fixed duty-cycle.

11. The system of claim 10, wherein the substantially fixed duty-cycle is a substantially maximum non-overlapping duty-cycle with respect to alternately activated switches of the switching stage.

* * * * *

UNITED STATES PATENT AND TRADEMARK OFFICE
CERTIFICATE OF CORRECTION

| | | |
|---|---|---|
| PATENT NO. | : 9,054,593 B2 | Page 1 of 1 |
| APPLICATION NO. | : 13/151939 | |
| DATED | : June 9, 2015 | |
| INVENTOR(S) | : Humphrey et al. | |

It is certified that error appears in the above-identified patent and that said Letters Patent is hereby corrected as shown below:

On the title page item [73], delete "Hosuton," and insert -- Houston, --, therefor.

Signed and Sealed this
Twenty-third Day of February, 2016

Michelle K. Lee
*Director of the United States Patent and Trademark Office*